United States Patent
Atsatt et al.

(10) Patent No.: US 9,170,911 B1
(45) Date of Patent: Oct. 27, 2015

(54) PROTOCOL ERROR MONITORING ON AN INTERFACE BETWEEN HARD LOGIC AND SOFT LOGIC

(71) Applicant: Altera Corporation, San Jose, CA (US)

(72) Inventors: Sean R. Atsatt, Santa Clara, CA (US); Samuel Johannes Hedinger, Austin, TX (US); Steve Jahnke, Allen, TX (US); Lean Kim Ong, Permatang Pauh (MY)

(73) Assignee: Altera Corporation, San Jose, CA (US)

( * ) Notice: Subject to any disclaimer, the term of this patent is extended or adjusted under 35 U.S.C. 154(b) by 265 days.

(21) Appl. No.: 13/938,014

(22) Filed: Jul. 9, 2013

(51) Int. Cl.
*G06F 11/00* (2006.01)
*G06F 11/30* (2006.01)

(52) U.S. Cl.
CPC .................................. *G06F 11/3041* (2013.01)

(58) Field of Classification Search
CPC ......................... G06F 11/0751; G06F 11/0766
USPC ...................................................... 714/48, 39
See application file for complete search history.

(56) References Cited

U.S. PATENT DOCUMENTS

| | | | |
|---|---|---|---|
| 5,734,422 A * | 3/1998 | Maurer et al. | 348/184 |
| 5,844,917 A * | 12/1998 | Salem et al. | 714/724 |
| 6,985,980 B1 | 1/2006 | Allegrucci | |
| 7,111,213 B1 | 9/2006 | Dastidar et al. | |
| 7,478,299 B2 | 1/2009 | Brandyberry et al. | |
| 9,003,246 B2 | 4/2015 | Mozak et al. | |
| 2006/0107153 A1* | 5/2006 | Pham | 714/736 |
| 2006/0156157 A1* | 7/2006 | Haselden et al. | 714/746 |
| 2007/0220367 A1* | 9/2007 | Smith et al. | 714/48 |

OTHER PUBLICATIONS

U.S. Appl. No. 14/100,841, "Run-time recovery of malformed interconnect response," Steve Jahnke, filed Dec. 9, 2013.
Qsys Interconnect 8, Q1151021, ISO 9001-2008 Registered, ALTERA®, pp. 8-1-8-60, Nov. 4, 2013.
U.S. Notice of Allowance dated Jun. 5, 2015 issued in USSN 14/100,841.

* cited by examiner

*Primary Examiner* — Chae Ko
(74) *Attorney, Agent, or Firm* — Weaver Austin Villeneuve & Sampson LLP

(57) ABSTRACT

Techniques and mechanisms detect deviations from a protocol being used to communicate between devices, for example, in hard logic (e.g., implemented as an ASIC or fixed circuitry) and soft logic (e.g., implemented in configurable logic of an FPGA). Techniques and mechanisms are described for detecting a variety of deviations from a protocol.

21 Claims, 11 Drawing Sheets

PROTOCOL ERROR MONITORING ON AN INTERFACE BETWEEN HARD LOGIC AND SOFT LOGIC

TECHNICAL FIELD

The present disclosure generally relates to integrated circuits. More specifically, the present disclosure relates to techniques and systems for implementing a monitoring unit on an interface between hard logic and soft logic.

DESCRIPTION OF RELATED ART

A programmable logic device (PLD) is a semiconductor integrated circuit which contains logic circuitry and routing that may be configured to perform a host of logic functions. In a typical scenario, a designer uses electronic design automation (EDA) tools to create a design. These tools use information regarding the hardware capabilities of a given programmable logic device to help the designer implement the custom logic circuit using multiple resources available on that given programmable logic device.

In some systems, a PLD may interface with another device, such as a fixed logic device such as an application specific integrated circuit (ASIC), structured ASIC, processor, or other device. Accordingly, the configurable logic (or soft logic) of the PLD may interact with the fixed logic (or hard logic) of the ASIC. Additionally, a single device may include both hard logic and soft logic. For example, a device may include a hardened processor system (i.e., hard logic) and configurable logic (i.e., soft logic). To enable proper communication between the circuitry implemented in the hard logic and the soft logic, a particular protocol may be followed.

However, if circuitry does not fully implement, or deviates, from the protocol, failures may occur. Therefore, detecting, preventing, and/or correcting errors in the protocol may provide a multitude of advantages. For example, detecting, preventing, and/or correcting errors may prevent a system from stalling or crashing.

SUMMARY

The techniques and mechanisms of the present disclosure detect deviations from a protocol being used at an interface between devices.

The present disclosure provides improved mechanisms for detecting protocol errors between logic implemented in hard logic and soft logic. In one example, a monitoring unit may be implemented in soft logic between a master device implemented in hard logic and a slave device implemented in soft logic. Accordingly, communications between the master device in the hard logic and the slave device in the soft logic may be supervised by the monitoring unit. For instance, the monitoring unit may detect deviations from a protocol expected to be followed by communications between the master and slave devices. Based on the deviations from the protocol, the monitoring unit may alert the particular device as to an error in the communication. Thus, an error may be detected and appropriate action may be taken to prevent a failure due to the deviation from the protocol.

These and other features will be presented in the following specification and the accompanying figures, which illustrate by way of example the principles of the invention.

DESCRIPTION OF PARTICULAR EMBODIMENTS

The techniques and mechanisms of the present disclosure are primarily described with reference to PLDs such as FPGAs, but is not necessarily limited to PLDs. As disclosed herein, the techniques and mechanisms may be implemented in hard logic and soft logic in a variety of configurations. Both hard logic and soft logic may be on a single device. Additionally, hard logic and soft logic may be on separate devices or chips. For example, a device may include a hardened processor system (i.e., hard logic) and configurable logic (i.e., soft logic) on a single chip. Alternatively, an ASIC (i.e., hard logic) with particular functionality may interface with configurable logic of an FPGA (i.e., soft logic). In other implementations, a device in hard logic may communicate through an interface, also in hard logic, to another device also configured in hard logic. A device in soft logic may communicate through an interface, also in soft logic, to another device also configured in soft logic. Moreover, a device in hard logic may communicate to another device in hard logic through an interface in soft logic. A device in soft logic may communicate to another device in soft logic through an interface in hard logic. The present disclosure provides examples of several, but not all, configurations.

Figure 1A:
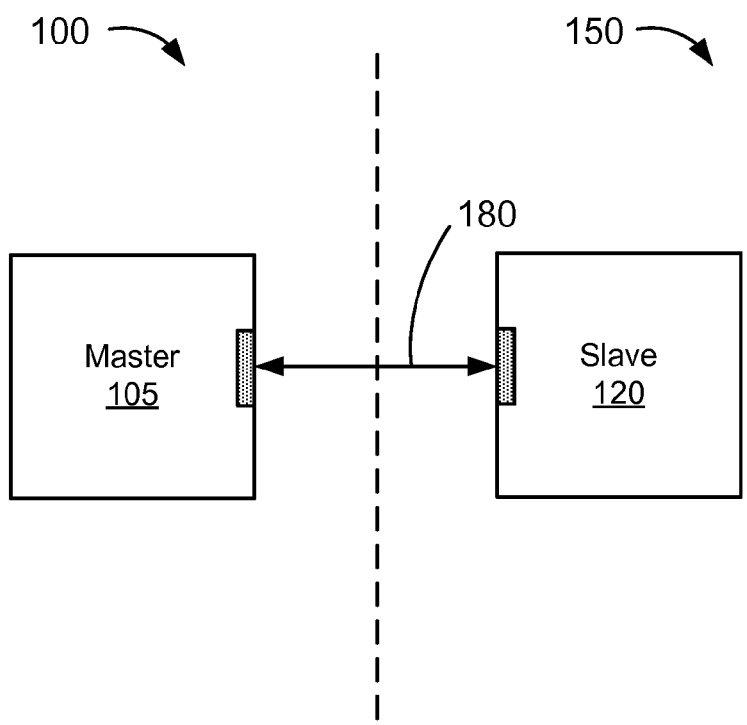
FIG. 1A is a schematic of devices configured to communicate through an interface between hard logic and soft logic according to an exemplary embodiment.

FIG. 1A is an example of a schematic of devices configured to communicate through an interface between hard logic and soft logic. In the implementation of FIG. 1A, master device 105 may reside in hard logic 100, e.g. hardened system-on-a-chip (SOC) logic. For example, master 105 may be a hard processor system (HPS) or an application specific integrated circuit (ASIC) designed for a particular functionality.

Master 105 may be configured to communicate with slave 120. In an implementation, slave 120 may be programmed or configured within soft logic 150, such as the configurable logic of a field programmable gate array (FPGA). For example, a variety of memories or other peripherals may be instantiated within the configurable logic of the FPGA. Accordingly, communications 180 from master 105 to slave 120 may cross from hard logic 100 to soft logic 150, i.e. a device on hard logic to a device on soft logic.

In some implementations, communications 180 may rely upon a protocol. For example, master 105 and slave 120 may communicate with each other using Advanced eXtensible Interface (AXI), Avalon, or other protocols that may be used to communicate data between devices on an FPGA fabric (i.e., soft logic 150) and HPS logic (i.e., hard logic 100).

However, components and interconnect implemented within the soft logic of an FPGA may include a variety of design flaws. For example, the soft logic of an FPGA may be reconfigured multiple times as part of an iteration loop of the design process, incrementally fixing bugs. In another example, a user's design configured in the soft logic of the FPGA may not properly follow the protocol being used. Accordingly, a design in an FPGA may not fully implement the particular protocol being used to facilitate communications between master 105 and slave 120. A design configured within the soft logic of an FPGA and not fully implementing, or deviating, from the protocol used by master 105 may cause failures within master 105 in hard logic 100.

For example, master 105 may be an HPS and slave 120 may be memory configured within soft logic 150. Accordingly, master 105 may initiate a transaction requesting data at a particular memory location. However, if the protocol requires transactions to be returned within a set amount of time, but slave 120 does not respond with the requested data, master 105 may be left "hanging," or stalled while waiting for the data to be received.

Figure 1B:
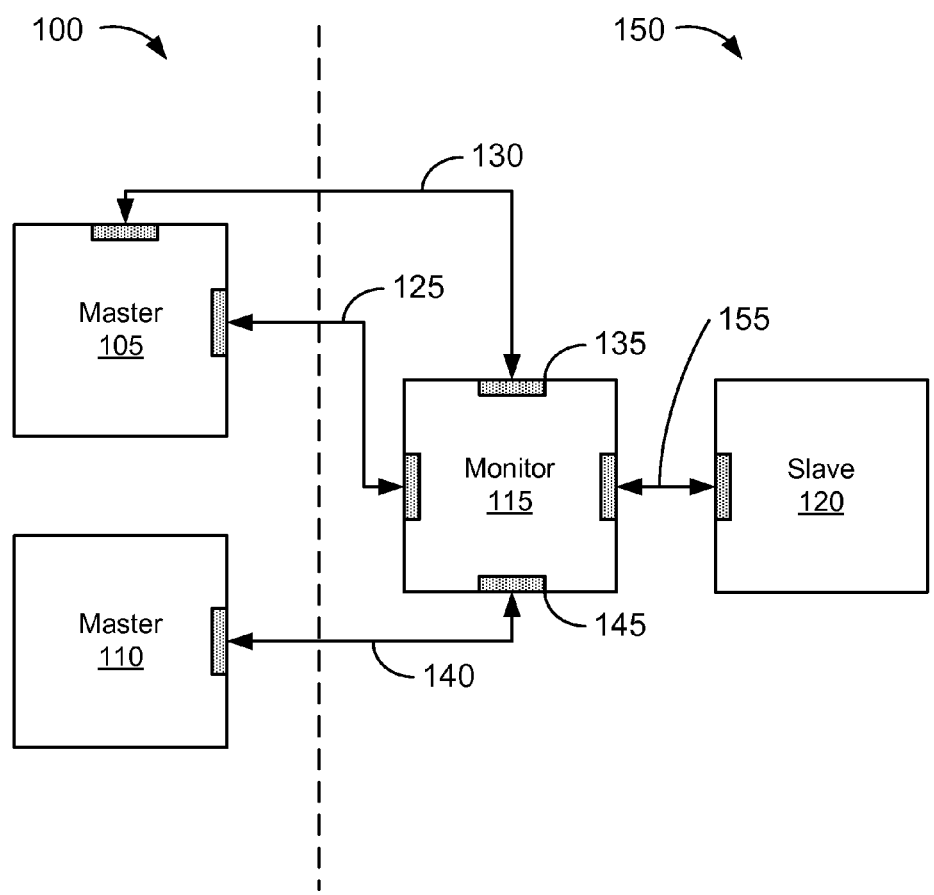
FIG. 1B is a schematic of devices configured to communicate through an interface between hard logic and soft logic via a protocol monitoring unit in soft logic according to an exemplary embodiment.

FIG. 1B is an example of a schematic of devices configured to communicate through an interface between hard logic and soft logic via a protocol monitoring unit. In the implementation of FIG. 1B, master device 105 may also reside in hard logic 100. Additionally, as in FIG. 1A, a slave device 120 may be instantiated in soft logic 150. However, communications between master 105 and slave 120 may be through monitor 115. For example, master 105 may provide communication 125 to monitor 115. The monitor may forward the communication to slave 120 via communication 155. Responses from slave 120 to master 105 may also be monitored and forwarded by monitor 115.

In FIG. 1B, monitor 115 is also instantiated within soft logic 150. In some implementations, monitor 115 may verify communications between master 105 and slave 120 to ensure that the rules of the particular interface protocol are being complied with. For example, as previously discussed, master 105 may send a request to slave 120, such as memory, for data at a particular memory location. Under the protocol being used to facilitate communications between master 105 and slave 120, slave 120 may be required to respond within a particular time frame. However, if slave 120 fails to respond to the request by master 105, master 105 may stall while it waits for the request.

Accordingly, monitor 115 may detect deviations from the protocol. As such, monitor 115 may prevent errors that may cause a crash of the system operating in hard logic 100 from propagating from soft logic 150 to master 105 in hard logic 100. Monitor 115 may also finish any hanging acknowledgements or requests that master 105 is expecting from slave 120 so as to ensure that the system on hard logic 100 may not stall, and therefore, recover from any deviations from the expected protocol. Monitor 115 may also log errors and/or alert master 105 to any detected errors.

In some implementations, monitor 115 may include a variety of inputs and outputs. For example, monitor 115 may be able to communicate with master 105 and slave 120 via communications 125 and 155. Additionally, monitor 115 may include an interrupt request (IRQ) input/output (I/O) 135 to alert a device on hard logic 100, such as master 105, that an error has occurred in a transmission received from slave 120. Accordingly, when an error is detected, the error may be logged, and an interrupt flag or signal may be asserted to alert master 105 as to a deviation from the protocol. As such, master 105 may be able to handle the protocol error or deviation without crashing or stalling the system.

Monitor 115 may also include control and status registers (CSR) accessible through a CSR I/O 145. CSR may be used to store data regarding detected errors or deviations from the protocol used. CSR input/output 145 may provide another device access to data regarding the errors. Data that may be stored in the CSR include transaction IDs, destination addresses, data burst types, data burst lengths (e.g., number of bits or words), data sizes, time the transaction was sent by the master, time the slave responded to the request from the master, master id, slave id, and other characteristics.

In an implementation, hard logic 100 may include a variety of devices. For example, in FIG. 1B, master 110 is also in hard logic. Master 110 may be used to access CSR port 145 of monitor 115 via communication 140. In other implementations, master 105 may be able to access CSR I/O 145.

Figure 1C:
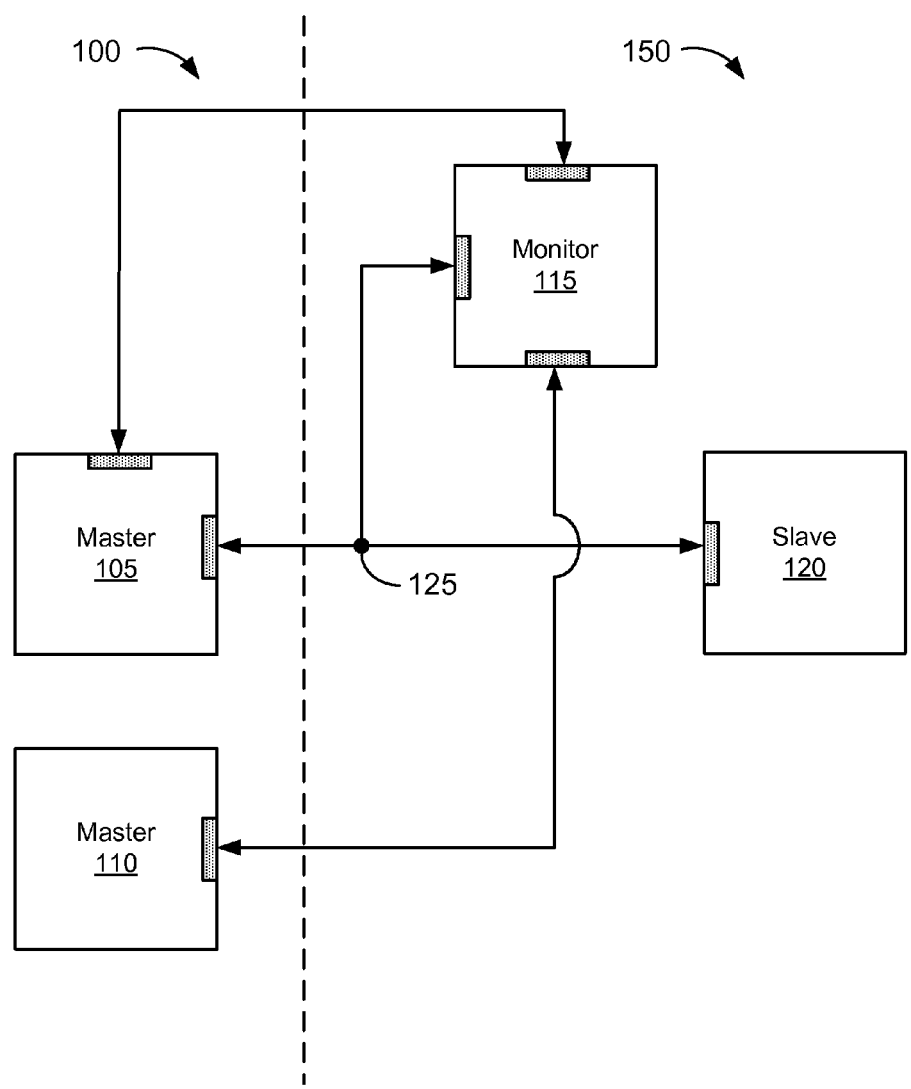
FIG. 1C is a schematic of devices configured to communicate through an interface between hard logic and soft logic according to an exemplary embodiment.

FIG. 1C is another implementation of devices configured to communicate through an interface between hard logic and soft logic. In FIG. 1C, master 105 in hard logic 100 may communicate directly with slave 120. Accordingly, transactions between master 105 and slave 120 are not through monitor 105. However, monitor 115 may still monitor the transactions between master 105 and slave 120 because communication 125 is also provided as an input to monitor 115. In FIG. 1C, the interconnect of communication 125 branches off in soft logic 150 to provide access for monitor 115. As such, communication 125 crosses the interface between hard logic 100 and soft logic 150 once. However, in other implementations, the interconnect may branch off in hard logic 100. Accordingly, the interconnect of communication 125 may cross the hard logic 100 and soft logic 150 interface twice.

In FIG. 1C, though master 105 and slave 120 may have direct communication with each other, monitor 115 may still monitor the communications to ensure that the requirements of the protocol are being followed. Accordingly, if slave 120 transmits a response that deviates from the communication protocol back to master 105, monitor 115 may detect the deviation and take appropriate precautions. For example, monitor 115 may assert an IRQ flag or signal when an error is detected. Accordingly, master 110 may review the status of the IRQ signal before processing communications from slave 120.

Figure 1D:
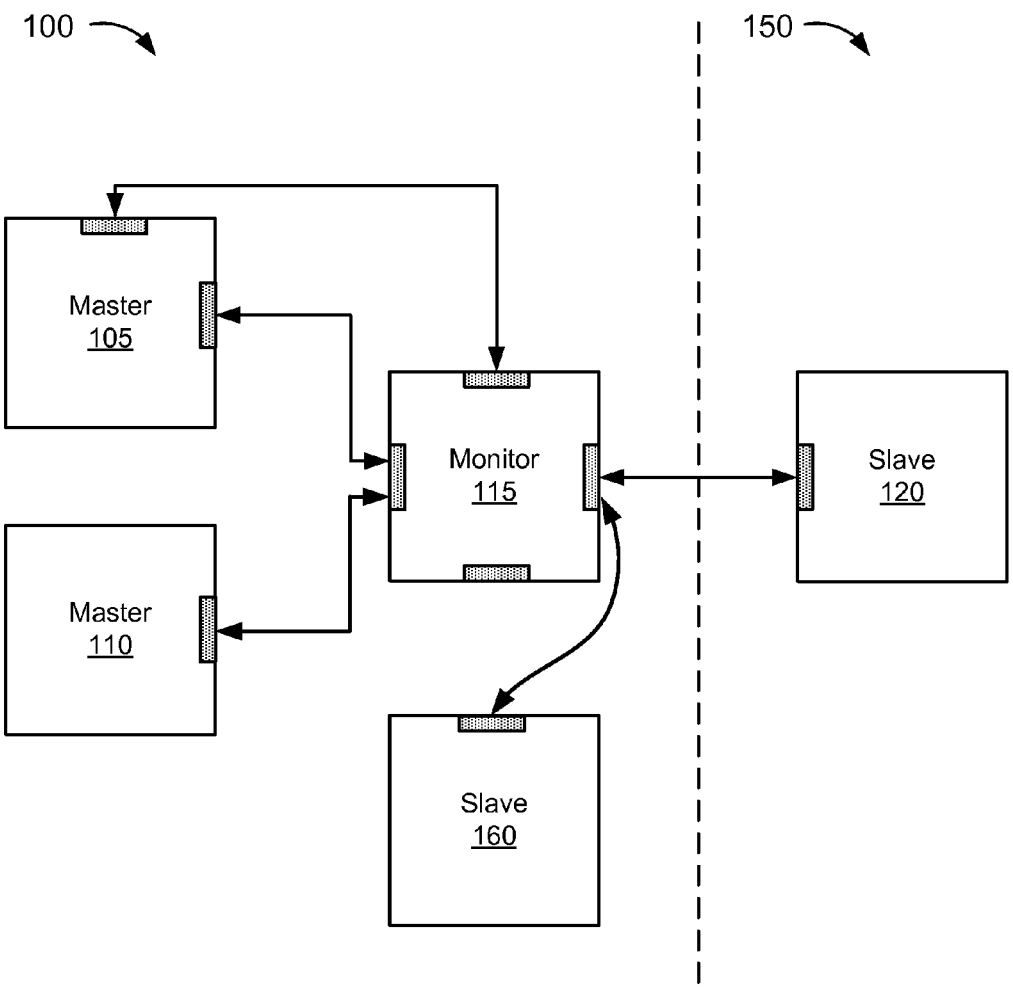
FIG. 1D is a schematic of devices configured to communicate through an interface between hard logic and soft logic via a protocol monitoring unit in hard logic according to an exemplary embodiment.

FIG. 1D is another implementation of devices configured to communicate through an interface between hard logic and soft logic. In FIG. 1D, monitor 115 is in hard logic 100 rather than soft logic 150. Moreover, a second slave device, slave 160, is also in hard logic. Accordingly, monitor 115 may monitor communications from slave devices in both hard logic and soft logic. In other implementations, monitor 115 may be in soft logic 150 and monitor slave devices implemented in both hard logic 100 and soft logic 150.

In some implementations, monitor 115 may ensure proper use of a protocol for multiple master and slave devices. For example, in FIG. 1D, monitor 115 also monitors transactions related to master 110. Accordingly, both masters 105 and 110 may issue transactions to slaves 120 and 160. Communications between the four devices may be monitored by monitor 115.

Figure 1E:
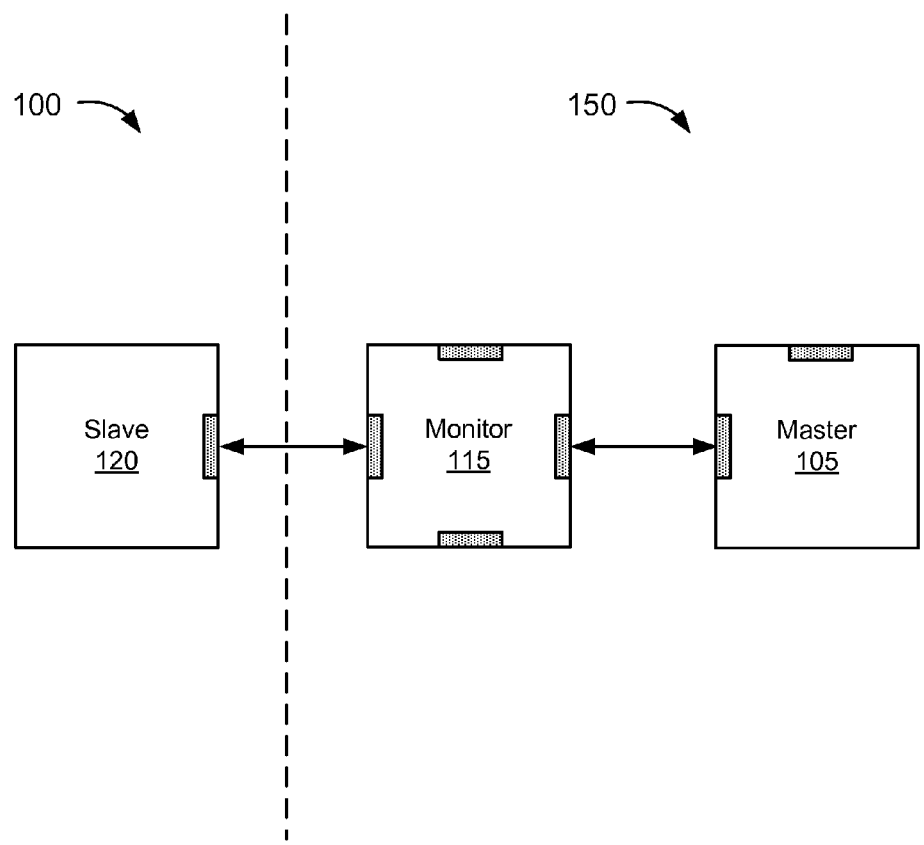
FIG. 1E is a schematic of devices configured to communicate through an interface between hard logic and soft logic according to an exemplary embodiment.
Figure 1F:
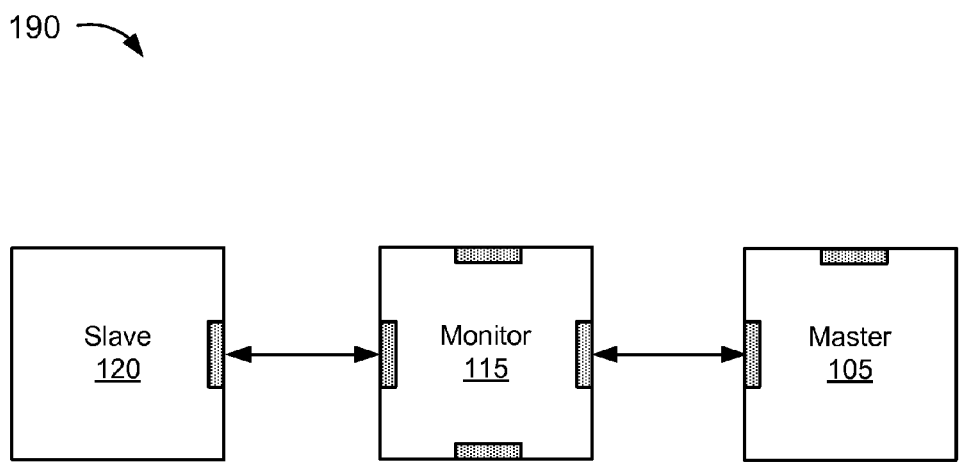
FIG. 1F is a schematic of devices configured to communicate via a protocol monitoring unit according to an exemplary embodiment.

FIG. 1E is another implementation of devices configured to communicate through an interface between hard logic and soft logic. Unlike FIGS. 1A-1D, in FIG. 1E, master 105 resides in soft logic 150 and slave 120 resides in hard logic 100. Accordingly, transactions may be issued from soft logic 150 to slave devices on hard logic 100. Additionally, FIG. 1F is another schematic of devices configured to communicate via a protocol monitoring unit. In FIG. 1F, master 105, monitor 115, and slave 120 reside in logic 190. Logic 190 may be soft logic or hard logic. As such, the devices may communicate within the same type of logic.

Figure 2:
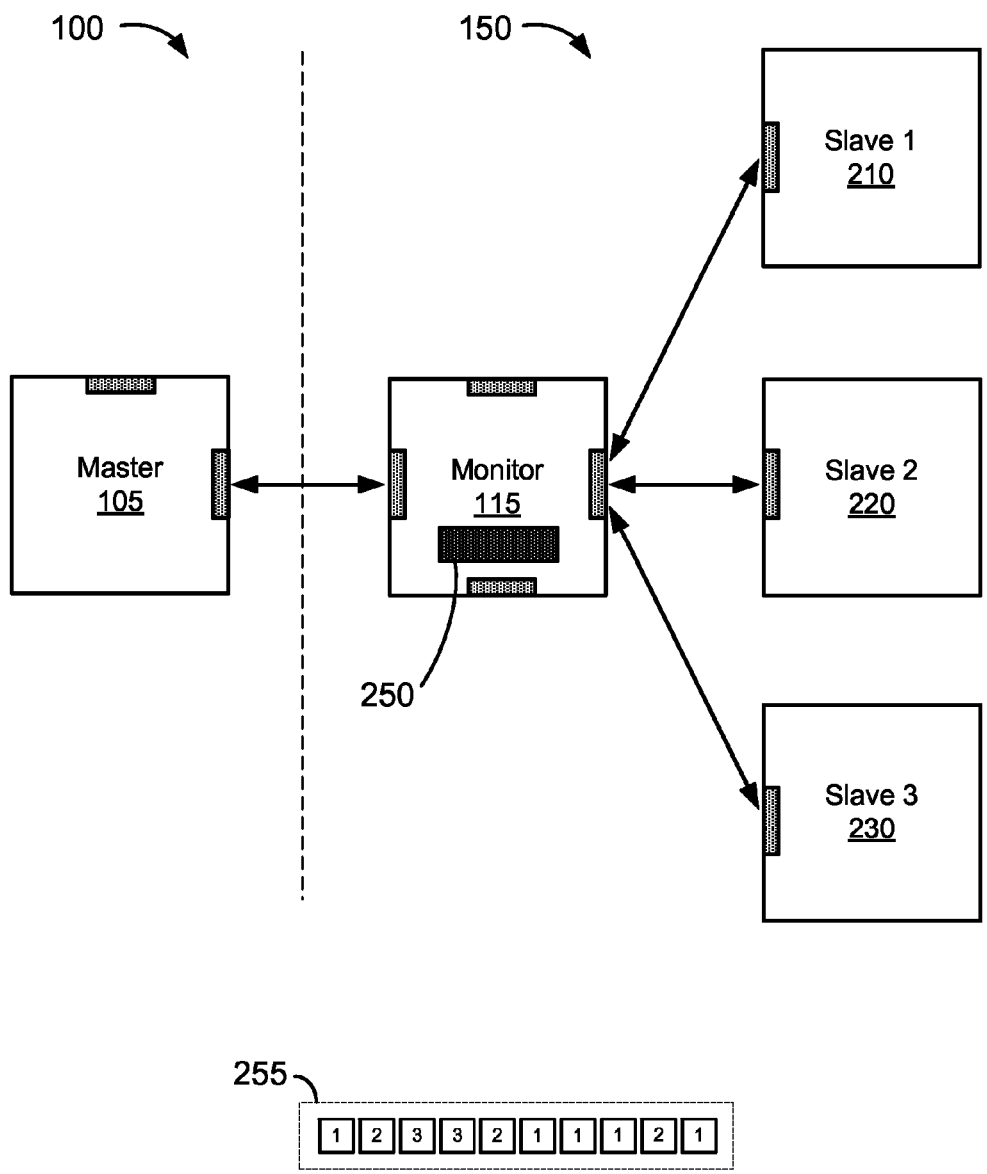
FIG. 2 is a schematic of a master device in hard logic configured to communicate with slave devices in soft logic via a protocol monitoring unit according to an exemplary embodiment.

FIG. 2 is an example of a schematic of devices configured to communicate through an interface between hard logic and soft logic via a protocol monitoring unit. In FIG. 2, master 105 may be designed in hard logic 100. Monitor 115 may be designed in soft logic 150. Soft logic 150 may also include multiple slave devices, such as slave 1 210, slave 2 220, and slave 3 230.

Slaves 210-230 may be configured on the same FPGA fabric, i.e. on a single FPGA, or on multiple FPGAs. In some implementations, monitor 115 may be on the same FPGA as a slave. In other implementations, monitor 115 may be configured on its own FPGA.

Monitor 115 may ensure that communications between master 105 and slaves 210-230 are following a particular communication protocol. Accordingly, monitor 115 may include memory 250 which may be used to log information on the characteristics of any transactions between master 105 and slaves 210-230. As previously discussed, monitor 115 may log, for example, transaction IDs, destination addresses, source of transactions, data burst types, data burst lengths (e.g., number of bits or words), data sizes, time the transaction was sent by the master, time the transaction from the slave was received at monitor 105, sequence of transactions, sequence of destinations of transactions, master id, and slave id.

For example, memory 250 may provide slave transaction sequence 255. Slave transaction sequence 255 may record the sequence of transactions from master 105 to particular slaves 210-230. As such, slave transaction sequence 255 may specify the order in which slaves 210-230 were addressed by master 105 when issuing transactions that are monitored via monitor 115. In slave transaction sequence 255, the numeral "1" corresponds to slave 1 210, "2" corresponds to slave 2 220, and "3" corresponds to slave 3 230.

By logging data, Monitor 115 may detect a variety of errors. For example, FIGS. 3A-D illustrate a subset of the types of errors detected by monitor 115.

Figure 3A:
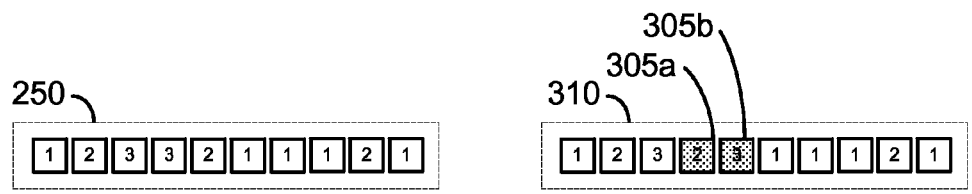
FIG. 3A illustrates an example of detected disordered transactions.

FIG. 3A depicts an implementation of detection of disordered transactions by monitor 115. For example, monitor 115 may store in memory 250 a sequence of transactions or communications issued from master 105 to slaves 210-230 of FIG. 2. In the example of FIG. 3A, master 105 has stored a sequence of transactions in memory 250 indicating that the destination of transactions from master 105 to slave "1," "2,", "3," "3," "2," "1," "1," "1," "2," and "1." Each transaction may include a different type of operation. For example, the sequence of transactions may indicate a mix of read and write commands to memory peripherals in soft logic 150.

In FIG. 3A, received transactions 310 may represent a sequence of transactions returned from slaves 210-230 in response to a request from master 105. The numerals in received transactions 310 correspond to the particular slave that the transaction is from. Accordingly, received transactions 310 should match the sequence of transactions stored in memory 250. However, in the example of FIG. 3A, transactions 305a and 305b are switched. That is, transaction 305b should have been returned before transaction 305a. Accordingly, a disordered transaction, or sequence of transactions, may be detected. In some implementations, the disordered transaction may be an indication of a violation of a protocol's specification. As such, an interrupt signal or flag may be asserted to alert the system on hard logic 100 that a deviation or error in the communication protocol has occurred in soft logic 150.

In some implementations, each type of operation (e.g., a write, a read, etc.) may have its own sequence of transactions monitored by monitor 115. Accordingly, disordered write transactions may be detected separately from disordered read transactions.

Figure 3B:
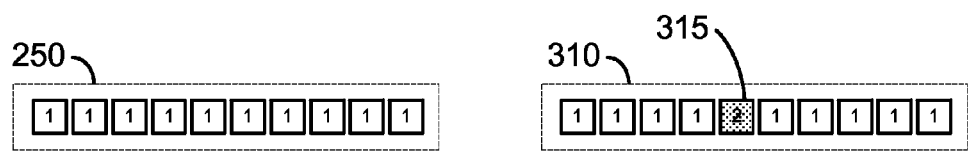
FIG. 3B illustrates an example of detecting unexpected transactions.

FIG. 3B depicts an implementation of detection of an unexpected transaction. As previously discussed, memory 250 may include a list of transactions. In FIG. 3B, memory 250 indicates a series of transactions to slave 210 (i.e., slave 1). FIG. 3B also shows a sequence of transactions 310 received by monitor 105.

In FIG. 3B, transaction 315 may be considered to be an unexpected transaction because memory 250 indicates that master 105 did not submit a transaction to slave 220 (i.e., slave 2). That is, master 105 is not expecting a response from slave 220. Rather, master 105 is only expecting responses from slave 210 (i.e., slave 1). Accordingly, transaction 315 may be determined to be an unexpected transaction. As such, the unexpected transaction may be designated as a violation of the protocol being used to communicate between master 105 in hard logic 100 to the slave devices in soft logic 150. Monitor 115 may assert an IRQ signal to alert master 105 to the unexpected transaction.

Figure 3C:
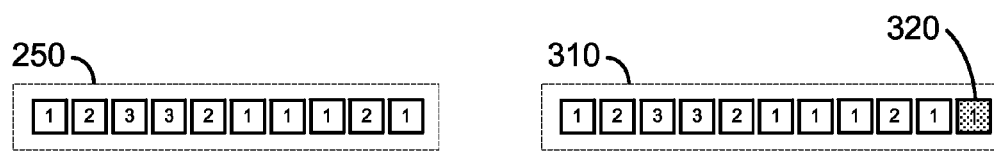
FIG. 3C illustrates an example of limiting outstanding transactions.

In some implementations, monitor 115 may also control the number of outstanding transactions issued by master 105. For example, monitor 115 may throttle, or limit, the maximum number of outstanding transactions that may be issued by master 105 in order to ensure proper tracking of transactions, for example, due to limitations of monitor 115 or to reduce errors related to a high number of outstanding transactions. FIG. 3C depicts an implementation of detection of limiting the number of outstanding transactions.

In FIG. 3C, memory 250 may track ten transactions at a time. Transactions 325 indicates the transactions received at monitor 115 from master 105. Accordingly, the first ten transactions of transactions 325 are tracked, as indicated by memory 250. The ten transactions are pending results from slaves 210-230. However, transaction 320 may indicate an eleventh transaction that may be forwarded to slave 210 (i.e., slave 1) from master 105 via monitor 115. In some implementations, monitor 115 may throttle, or delay, the issuance of transaction 320 because the limit of outstanding transactions (i.e., ten) has already been reached. As such, an IRQ signal may be asserted by monitor 115 to indicate that the number of pending transactions has been reached. Accordingly, master 105 may be throttled, i.e. limit the number of outstanding transactions. The IRQ may be asserted upon memory 250 reaching the maximum number of transactions. Alternatively, the IRQ may be asserted upon receipt of the first transaction beyond the maximum number of transactions (e.g., the 11$^{th}$ transaction for a limit of 10 transactions to be tracked).

In some implementations, the number of outstanding transactions may be changed. For example, monitor 115 may increase or decrease the number of allowable outstanding transactions issued by master 105 and awaiting from slaves 210-230. In an implementation, if errors are detected, monitor 115 may decrease the number of allowable outstanding transactions. As such, the performance of master 105 may be decreased, but reliability potentially increased, due to monitor 115 throttling the total number of outstanding transactions at slaves 210-230.

In other implementations, monitor 115 initially may not limit the number of outstanding transactions. However, upon detection of errors, throttling by monitor 115 may begin to ensure that all outstanding transactions may be tracked.

In some implementations, different types of transactions may have different limits to the maximum number of outstanding transactions. For example, writing to a memory peripheral (e.g., slave 1) may be limited to 10 outstanding transactions. However, reading from a memory peripheral may be limited to 20 outstanding transactions. In other implementations, each of slaves 210-230 may have separate limits to outstanding transactions. For example, transactions to slave 210 may be limited to 10 outstanding transactions. However, transactions to slave 220 may be limited to 20 outstanding transactions.

Figure 3D:
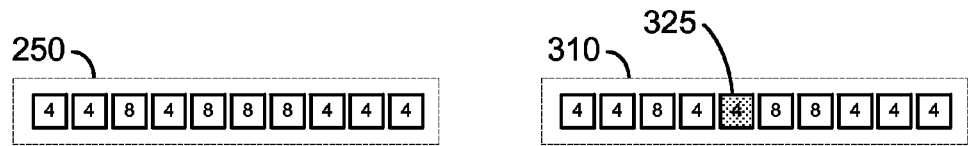
FIG. 3D illustrates an example of detecting a transaction with an incorrect burst size.

FIG. 3D depicts an implementation of detection of a transaction with an incorrect burst size. If a slave in soft logic 150 sends a transaction back to a master in hard logic 100, the master may wait until the entire transaction is received. However, if the returned transaction is supposed to be eight words of data, but a slave begins transmitting five hundred words, the master in the hard logic may stall until the slave finishes the transmission of the five hundred words. Accordingly, detection of incorrect burst sizes may prevent stalling of the master.

In the implementation of FIG. 3D, memory 250 may also include data regarding expected burst sizes of transactions that master 105 is expecting from slaves 210-230. For example, certain transactions returned from soft logic 150 may be four or eight words. Accordingly, memory 250 may store the expected burst size of transactions. In FIG. 3D, received transactions 310 may be checked with the recorded expected transaction size. As such, transaction 325 may be determined to be violating the protocol as it is expected to be 8 words, but only 4 words were received.

In other implementations, monitor 115 may determine the type of transaction that is coming from slaves 210-230 and the associated burst size for the type of transaction. Thus, monitor 115 may be able to determine an error has occurred when the burst of data from the slave continues past the expected burst size. For example, monitor 115 may determine that a transaction from a slave is a result of a read request from a master. Accordingly, monitor 115 may determine that read requests have burst lengths of a particular size or length, and thus, determine if the transaction deviates from the protocol.

In an implementation, monitor 115 may also determine whether a response does not occur within a time window. For example, master 105 may issue a series of read and write responses to slave 210. Each issued read and write transaction may have a specified time window for a slave to respond within. If a response from a slave occurs after the time window, then monitor 115 may determine that the transaction violates the protocol.

In some implementations, the time window may be changed. For example, if a large number of errors are occurring, the time window may be programmed to increase. In some implementations, the time window of a write response may be increased, while the time window of a read response may be decreased or stay the same, and vice versa.

In another implementation, the time window and number of outstanding transactions may both be changed to deal with errors occurring in soft logic 150.

Monitor 115 may also determine whether there is an identification mismatch on write data relative to a command. For example, as in FIG. 1E, master 105 may reside in soft logic 150. Master 105 may issue a write transaction to slave 120. In an implementation, a write command may be a separate transaction from write data. However, the write command may be associated with the write data with an identifier. Accordingly, master 105 may issue a write transaction request with a particular identification followed by the write data, or vice versa. As such, monitor may be able to determine if the write command and write data have the same identifier. If not, an error may be detected. Accordingly, the system may not stall upon a write command awaiting its corresponding write data.

Additionally, monitor 115 may generate error responses for all outstanding transactions upon a first transaction with an error. Accordingly, all outstanding transactions may be marked as errors. Master devices may then "unwind" its state to a point before the first transaction marked as an error. Upon receiving an interrupt generated by monitor 105, a master may unwind its state and then clear the interrupt via the CSR interface, as previously discussed. New transactions may be monitored by monitor 115 upon clearing of the interrupt through the CSR interface.

In some implementations, all outstanding transactions for all masters may be marked as errors. For example, in the configuration of FIG. 1D, upon a first detected error for a transaction associated with master 105, all outstanding transactions, including transactions for master 110, may be marked as in error by monitor 115. In other implementations, only transactions related to master 105 may be marked as errors whereas outstanding transactions for master 110 may be undisturbed by monitor 115.

Data from a sensor may be used to modify or reconfigure monitor 115. In an implementation, master 110 or monitor 115 may be configured to communicate with a temperature sensor, such as an on-chip diode temperature sensor or an off-chip ambient temperature sensor, and obtain data regarding temperature conditions. Temperature variations may alter the performance of a device. Accordingly, if the temperature reaches a threshold, monitor 115 may be modified. For example, if temperature increases and reaches a threshold temperature, monitor 115 may be configured to change any number of the aforementioned parameters (e.g., number of outstanding transactions, time window, etc.) used by monitor 115. Data from other sensors may determine signal integrity issues, battery levels, or other conditions that may lead to the modification of monitor 115. For example, upon a battery source (e.g., in a mobile device) reaching a threshold, the number of allowed outstanding transactions may be lowered, as previously discussed.

Monitor 115 may also detect a first set of errors, for example, in one type of protocol, but be reconfigured to detect a second set of errors in another protocol. In an implementation, upon an increase in detected errors or data from a sensor, additional monitoring methodologies may be implemented. For example, monitor 115 may initially only detect disordered transactions. However, upon detection of errors, monitor 115 may be reconfigured or reprogrammed to also detect unexpected transactions.

In some implementations, monitor 115 may also be configured to enable slave devices. In some configurable devices such as FPGAs, partial reconfiguration may be used to configure new logic while other logic is operational. For example, a master may communicate with a first slave device in soft logic, such as a memory unit. When the memory unit reaches a particular storage capacity threshold (e.g., 90%), a second memory unit may be configured in soft logic. However, the second memory unit may initially be disabled, but enabled by monitor 115 upon receipt of a transaction from the master addressing the second memory unit. Accordingly, because the second memory unit was disabled, transactions such as unexpected transactions may not occur. In another implementation, the second memory unit may be enabled when configured, but monitor 115 may ignore transactions received from the second memory unit the master addresses it for the first time. Accordingly, if the second memory unit deviates from the protocol before being addressed by the master, for example, by transmitting an unexpected transaction, monitor 115 may ignore the transaction. Even though an unexpected transaction was received by monitor 115, the master may not be alerted to the protocol error, and therefore, not unwind its state, as previously discussed. Additionally, outstanding transactions may be maintained (i.e., transactions associated with the first memory unit may not be discarded).

In an implementation, monitor 115 may also store the number of errors originating from slave devices. If the number of errors from a particular device reaches a threshold number, the slave device may be disabled. Additionally, the slave device may be reconfigured (e.g., via partial reconfiguration) elsewhere in configurable logic. For example, a fabrication defect may cause failures (e.g., a functional timing failure) in a circuit. Accordingly, it may be beneficial to reconfigure the configuration elements (e.g., configuration random access memory (CRAM) cells, antifuses, fuses, flash, etc.) associated with the slave device so as to try to avoid the fabrication defect. New configuration elements may be used to implement the logic of the slave device. In some implementations, the slave device may use the same configuration elements associated with placement of logic (i.e., the logic may be at the same locations), but use different configuration elements associated with routing resources (i.e., the interconnect between the logic may change), and vice versa. Monitor 115 may reconfigure the slave devices. Alternatively, monitor 115 may provide data regarding the slave device to be reconfigured to other logic or circuitry which may reconfigure the slave device.

Figure 4:
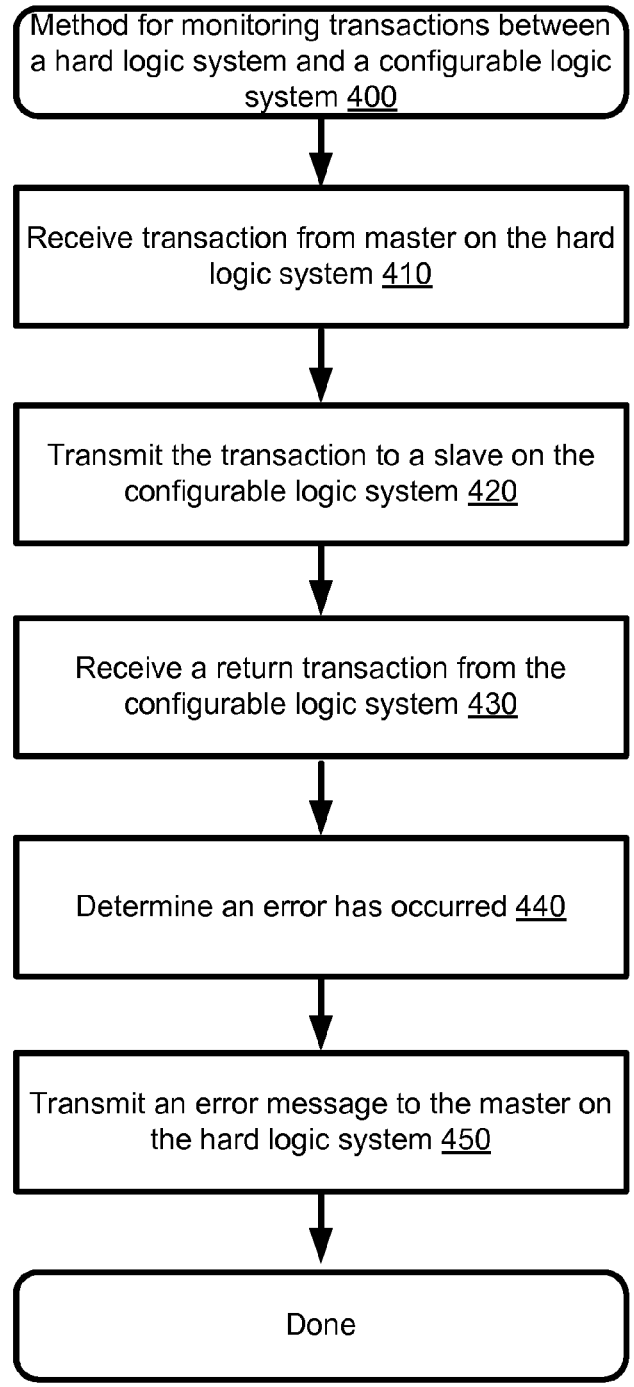
FIG. 4 is a flowchart illustrating a process flow for monitoring transactions between a hard logic system and a configurable logic system.

FIG. 4 shows a flowchart of an example of a method 400 for monitoring transactions between a hard logic system and a soft logic system (e.g., between an ASIC and an FPGA, a hardened processor system and configurable logic on a device, etc.). In method 400, a transaction from a master (e.g., a master in hard logic) may be received by a monitoring unit at block 410. At block 420, the monitoring unit may transmit the transaction to a slave on the configurable logic system (e.g., a peripheral configured in soft logic of an FPGA). At block 430, the monitoring unit may receive a transaction from a slave device in the configurable logic system. Accordingly, at block 440, the monitoring unit may determine if an error has occurred, as previously discussed with respect to FIG. 3. At block 450, if an error is detected, a message may be transmitted to the master on the hard logic system. For example, the monitoring unit may assert an IRQ signal. Additionally, the monitoring unit may finish any necessary acknowledgement or requests that the master is expecting from the slave.

Figure 5:
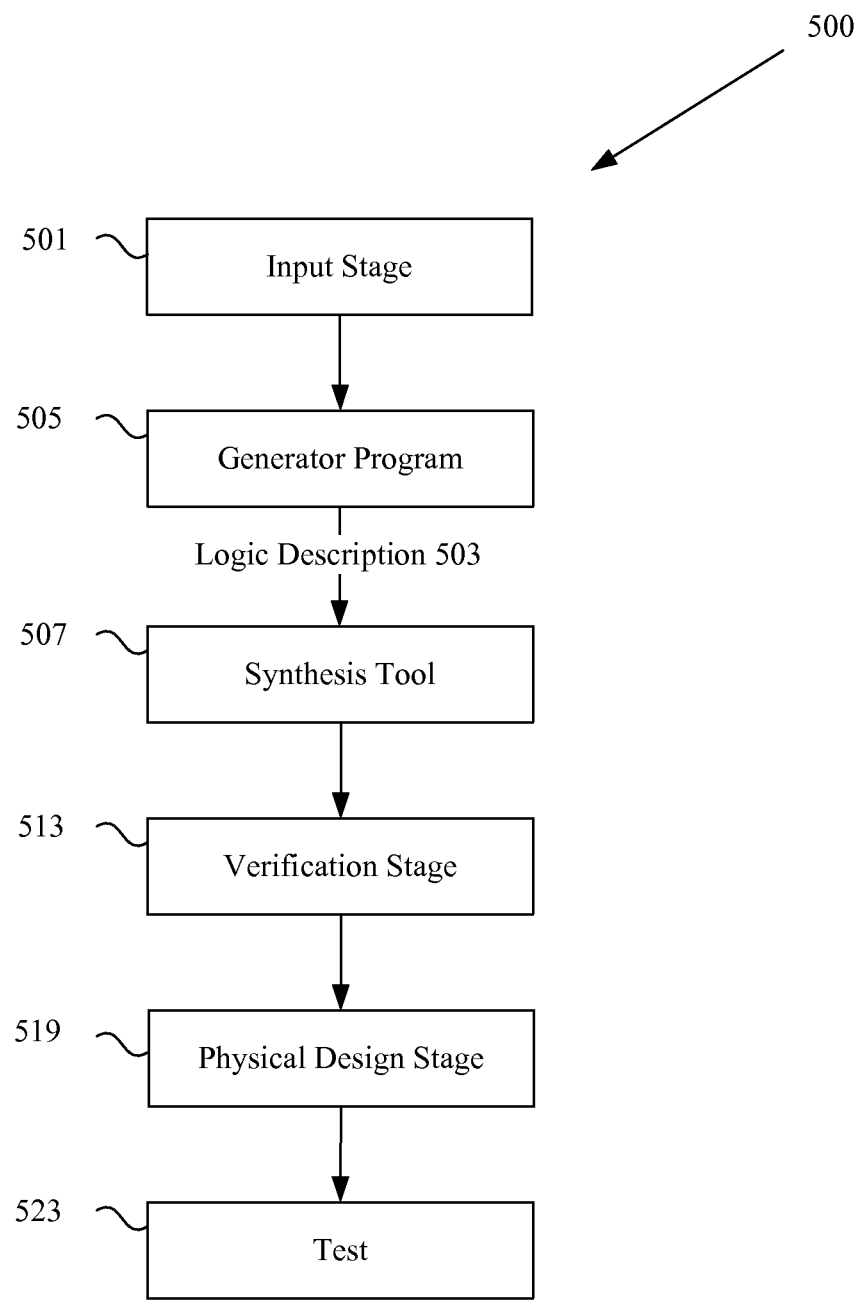
FIG. 5 illustrates a technique for implementing a programmable chip.

As previously discussed, in some implementations, the monitoring unit may be implemented in the soft logic of a programmable chip (e.g., FPGAs, CPLDs, etc.). FIG. 5 illustrates a technique for implementing a programmable chip. An input stage 501 receives selection information typically from a user for logic such as a processor core as well as other components to be implemented on an electronic device. In one example, the input received is in the form of a high-level language program. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. The input stage 501 also allows configuration of hard coded logic. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various modules selected.

In typical implementations, the generator program 505 can identify the selections and generate a logic description with information for implementing the various modules. The generator program 505 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 505 identifies pointers and provides ports for each pointer. One tool with generator program capabilities is System on a Programmable Chip (SOPC) Builder available from Altera Corporation of San Jose, Calif. The generator program 505 also provides information to a synthesis tool 507 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507. A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool locates logic cells on specific logic elements of a target hardware device and connects wires between the inputs and outputs of the various logic elements in accordance with logic and security provided to implement an electronic design. The iterative technique may be transparent to the user, but the resulting device can be physically tested at 523.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 6:
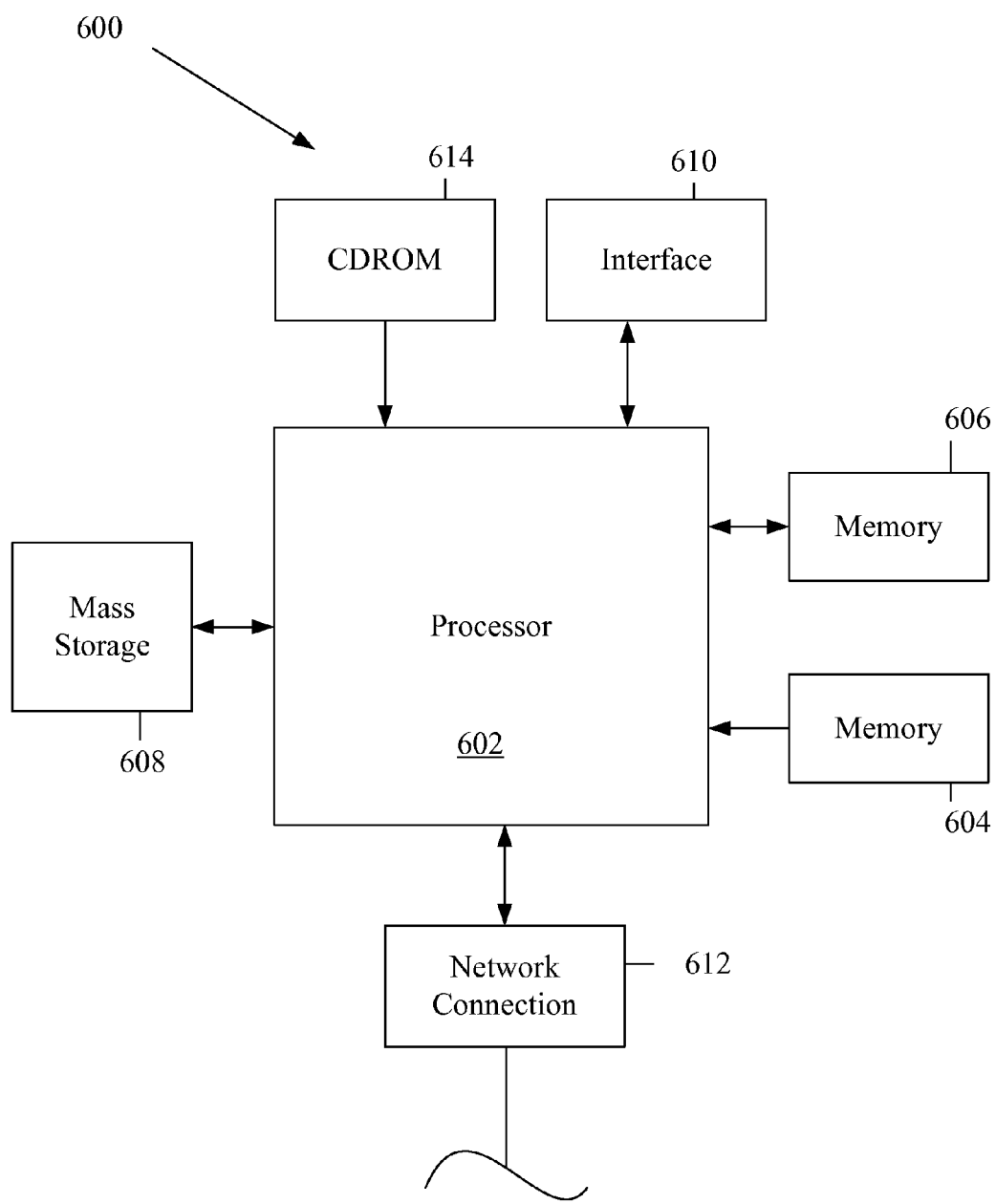
FIG. 6 illustrates one example of a computer system.

FIG. 6 illustrates one example of a computer system. The computer system 600 includes any number of processors 602 (also referred to as central processing units, or CPUs) that are coupled to devices including memory 606 (typically a random access memory, or "RAM"), memory 604 (typically a read only memory, or "ROM"). The processors 602 can be configured to generate an electronic design. As is well known in the art, memory 604 acts to transfer data and instructions uni-directionally to the CPU and memory 606 are used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 602 may be a design tool processor. Finally, CPU 602 optionally may be coupled to a computer or telecommunications network using a network connection as shown generally at 612. With such a network connection, it is contemplated that the CPU might receive information from the network, or might output information to the network in the course of performing the above-described process steps. It should be noted that the system 600 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for monitoring transactions between a hard logic system and a configurable logic system, the method comprising:
   receiving, on a monitoring circuit, a first transaction addressed to a first slave on the configurable logic system, the first transaction received from a master on the hard logic system;
   transmitting the first transaction to the first slave;
   receiving a first return transaction from the configurable logic system;
   determining an error has occurred in the configurable logic system; and
   transmitting an error message to the master.

2. The method of claim 1, wherein determining the error has occurred includes determining that a length of data of the first return transaction is incorrect.

3. The method of claim 1, wherein determining the error has occurred includes determining that the first return transaction is from a second slave on the configurable logic system.

4. The method of claim 1, further comprising:
   receiving, on the monitoring circuit, a second transaction addressed to a second slave from the master on the hard logic system, the second transaction received after the first transaction;
   transmitting the second transaction to the second slave; and
   wherein determining an error has occurred includes determining that a second return transaction associated with the second transaction is received before the first return transaction, and the error message indicating that the second return transaction is an error.

5. The method of claim 4, further comprising:
   transmitting a second error message to the master, the second error message indicating that the first transaction resulted in an error.

6. The method of claim 1, wherein determining the error has occurred includes determining that the first return transaction is not returned within a time window.

7. The method of claim 6, wherein a duration of the time window is increased upon an increase in errors detected in the configurable logic system.

8. The method of claim 1, further comprising:
   adding the first transaction to a queue of outstanding transactions; and
   determining that the queue of transactions does not exceed a threshold of outstanding transactions.

9. The method of claim 1, wherein the monitoring circuit is on the configurable logic system.

10. A circuit for monitoring transactions between a hard logic system and a configurable logic system, the circuit comprising:
    a monitoring circuit configured to:
       receive a first transaction addressed to a first slave on the configurable logic system, the first transaction received from a master on the hard logic system;
       transmit the first transaction to the first slave;
       receive a first return transaction from the configurable logic system;
       determine an error has occurred in the configurable logic system; and
       transmit an error message to the master.

11. The circuit of claim 10, wherein determining the error has occurred includes determining that a length of data of the first return transaction is incorrect.

12. The circuit of claim 10, wherein determining the error has occurred includes determining that the first return transaction is from a second slave on the configurable logic system.

13. The circuit of claim 10, wherein the monitoring circuit is further configured to:
    receive a second transaction addressed to a second slave from the master on the hard logic system, the second transaction received after the first transaction;
    receive the second transaction to the second slave; and
    wherein determining an error has occurred includes determining that a second return transaction associated with the second transaction is received before the first return transaction, and the error message indicating that the second return transaction is an error.

14. The circuit of claim 13, further configured to:
    transmit a second error message to the master, the second error message indicating that the first transaction resulted in an error.

15. The circuit of claim 10, wherein determining the error has occurred includes determining that the first return transaction is not returned within a time window.

16. The circuit of claim 15, wherein a duration of the time window is increased upon an increase in errors detected in the configurable logic system.

17. The circuit of claim 10, wherein the monitoring circuit is further configured to:
    add the first transaction to a queue of outstanding transactions; and
    determine that the queue of transactions does not exceed a threshold of outstanding transactions.

18. The circuit of claim 10, wherein the monitoring circuit is on the configurable logic system.

19. The circuit of claim 10, wherein the hard logic system and the configurable logic system are on the same device.

20. The circuit of claim 10, wherein the hard logic system and the soft logic system are on separate devices.

21. A circuit for monitoring transactions between a hard logic system and a configurable logic system, the circuit comprising:
    means for receiving, on a monitoring circuit, a first transaction addressed to a first slave on the configurable logic system, the first transaction received from a master on the hard logic system;
    means for transmitting the first transaction to the first slave;
    means for receiving a first return transaction from the configurable logic system;
    means for determining an error has occurred in the configurable logic system; and
    means for transmitting an error message to the master.

* * * * *